US010200629B2

(12) United States Patent
Stoppe et al.

(10) Patent No.: US 10,200,629 B2
(45) Date of Patent: Feb. 5, 2019

(54) IMAGE CAPTURING DEVICE AND METHOD FOR IMAGE CAPTURING (71) Applicant: Carl Zeiss Microscopy GmbH, Jena (DE)

(72) Inventors: Lars Stoppe, Jena (DE); Thomas Milde, Nausnitz (DE); Marco Hanft, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 12 days.

(21) Appl. No.: 15/504,157

(22) PCT Filed: Aug. 27, 2015

(86) PCT No.: PCT/EP2015/069683
§ 371 (c)(1),
(2) Date: Feb. 15, 2017

(87) PCT Pub. No.: WO2016/030479
PCT Pub. Date: Mar. 3, 2016

(65) Prior Publication Data
US 2017/0280039 A1 Sep. 28, 2017

(30) Foreign Application Priority Data
Aug. 29, 2014 (DE) .......... 10 2014 112 417
Sep. 3, 2014 (DE) .......... 10 2014 112 648

(51) Int. Cl.
H04N 5/235 (2006.01)
H04N 5/232 (2006.01)
(Continued)

(52) U.S. Cl.
CPC .......... H04N 5/2354 (2013.01); G06T 5/003 (2013.01); G06T 5/006 (2013.01); G06T 5/50 (2013.01);
(Continued)

(58) Field of Classification Search
CPC ............ H04N 5/2354; H04N 5/23232; H04N 5/2621; H04N 5/23264; H04N 1/00127;
(Continued)

(56) References Cited
U.S. PATENT DOCUMENTS 7,936,392 B2 *  5/2011  Ng ............... G02B 3/0056
                                         348/349
8,634,001 B2 *  1/2014  Okada ............ H04N 9/045
                                         348/222.1
(Continued)

FOREIGN PATENT DOCUMENTS

DE   102004012125 B3   9/2005
DE   102008025658 A1  12/2009
(Continued)

OTHER PUBLICATIONS

Guoan Zheng et al. Wide-field High-resolution Fourier Ptychographic Microscopy. Nature Photonics, vol. 7, No. 9, Jul. 28, 2013.
(Continued)

Primary Examiner — Luong T Nguyen
(74) Attorney, Agent, or Firm — Seyfarth Shaw LLP; Brian Michaelis (57) ABSTRACT For image recording purposes, an object is illuminated at a plurality of illumination angles. A detector captures a plurality of images (41-43) of the object for the plurality of illumination angles. An electronic evaluating device applies an image correction to the plurality of images (41-43), said image correction comprising a rectification ($T_1$, $T_2$, $T_3$), wherein the rectification ($T_1$, $T_2$, $T_3$) depends on the illumination angle used when recording the respective image (41-43). The corrected images (44-46) may be combined.

16 Claims, 8 Drawing Sheets (51) Int. Cl.
*H04N 5/262* (2006.01)
*G06T 5/00* (2006.01)
*G06T 5/50* (2006.01)
*H04N 1/00* (2006.01)

(52) U.S. Cl.
CPC ....... *H04N 5/2356* (2013.01); *H04N 5/23212* (2013.01); *H04N 5/23229* (2013.01); *H04N 5/23232* (2013.01); *H04N 5/2621* (2013.01); *G06T 2207/20221* (2013.01); *H04N 1/00127* (2013.01)

(58) Field of Classification Search
CPC .. H04N 5/23229; H04N 5/2356; G03T 5/003; G03T 5/006; G03T 5/50; G06T 2207/20221
See application file for complete search history.

(56) References Cited

U.S. PATENT DOCUMENTS

2008/0303919 A1* 12/2008 Egawa ................. G06T 1/0007
348/223.1
2011/0311107 A1 12/2011 Levesque
2012/0098950 A1 4/2012 Zheng et al.
2012/0176674 A1 7/2012 Lippert et al.
2014/0118529 A1* 5/2014 Zheng ..................... G21K 7/00
348/80
2015/0036917 A1* 2/2015 Nanri ................... G06T 7/0075
382/154

FOREIGN PATENT DOCUMENTS

DE 102011076435 A1 11/2012
WO 2009095422 A2 8/2009

OTHER PUBLICATIONS

International Search Report of PCT/EP2015/069683, dated Dec. 8, 2015.

* cited by examiner

IMAGE CAPTURING DEVICE AND METHOD FOR IMAGE CAPTURING

FIELD OF THE INVENTION

Exemplary embodiments of the invention relate to apparatuses and methods for recording images. In particular, exemplary embodiments relate to those apparatuses and methods which facilitate a computational correction of optical aberrations.

BACKGROUND

Modern optical systems should meet ever more stringent requirements in respect of image quality. The important aberrations, which should be kept low by the configuration of the optical system, include e.g. field curvature and astigmatism. In the case of field curvature, the image arises in a different plane along the optical axis depending on the field point. Thus, a field-dependent defocusing aberration emerges for planar image fields, for example a camera chip.

Highly precise and high-quality optical units may be used to reduce such aberrations. This often leads to complicated, large and expensive optical systems. Moreover, a large number of lenses may increase the reflection susceptibility of the system and/or reduce the transmission. This may be disadvantageous for many applications, for example in the field of expensive specialist appliances.

Alternatively, or additionally, use may be made of image sensors with curved image sensor surfaces at least in specialist applications for field curvature correction. However, this is not always possible and leads to increased costs. A further option for reducing the defocusing aberration caused by the field curvature consists of the use of optical systems, the overall depth-of-field of which is greater than the object field curvature. However, the numerical aperture of the overall system needs to be reduced to this end, leading to losses in resolution.

Alternatively, use may be made of more cost-effective optical units in combination with subsequent post-processing. Apparatuses and methods which combine cheaper optical units with subsequent post-processing may contain deconvolution techniques in the digital further processing. Such techniques, for example iterative deconvolution techniques, are often associated with high computational outlay. This may be found to be disadvantageous, in particular, if a fast calculation of an image is desired, for example for the real-time display of recorded specimen regions in a microscope system. Direct deconvolution methods may suffer from low accuracy and have a restricted field of application. A low contrast of the modulation transfer function (MTF) and/or a poor signal-to-noise ratio (SNR) of the image may lead to certain spatial frequencies determined using deconvolution techniques not being reconstructable or only being reconstructable under certain additional assumptions. By way of example, this may be the case for spatial frequency regions in which, on account of aberrations, the MTF has zeros. By way of example, such zeros in the MTF may occur in the case of astigmatism or defocus. Longitudinal chromatic aberrations may not be easily compensable by means of deconvolution techniques.

SUMMARY

There is a need for improved techniques for imaging an object. In particular, there is a need for apparatuses and methods which permit the use of cost-effective imaging optical units and which may reduce the computational complexity in the digital further processing compared to deconvolution techniques. In particular, there is a need for apparatuses and methods, by means of which field-point-dependent defocusing aberrations are correctable.

According to exemplary embodiments, apparatuses and methods, in which an object is illuminated at a plurality of illumination angles and an image is recorded in each case, are specified. The plurality of images are processed further by computation. Here, an image correction may be applied to each image of the plurality of images which contains a rectification depending on the illumination angle. After applying the image correction, the corrected images may be summed or processed further in a different manner.

The rectification of an image may be defined by a vector field which defines field-point-dependent displacements for pixels in the image. A field-point-dependent defocusing aberration, as should be corrected in the case of, for example, field curvature correction or astigmatism correction, may be taken into account thereby.

In the apparatuses and methods according to exemplary embodiments, an image correction may be carried out in a computationally efficient manner without the images needing to be deconvolved with the respective point spread function (PSF). The problems which are conventionally linked to zeros of MTFs may be reduced by the illumination at a plurality of illumination angles and by taking account of the illumination angles in the computational processing of the images. Information losses may be reduced by virtue of the images captured at a plurality of illumination angles being combined. The combination may be carried out by operations such as a rectification and addition, which can be carried out in a computationally efficient manner and which may satisfy a real-time condition.

An image-recording apparatus according to one exemplary embodiment comprises an illuminating device which is controllable in order to set a plurality of illumination angles for illuminating an object. The image-recording apparatus comprises a detector comprising an image sensor, configured to capture a plurality of images of the object for the plurality of illumination angles. The image-recording apparatus comprises an electronic evaluating device for processing the plurality of images, coupled to the image sensor. The electronic evaluating device is configured to apply an image correction to each image of the plurality of images, said image correction comprising a rectification, wherein the rectification depends on the illumination angle used when recording the respective image. The electronic evaluating device may be configured to combine the images corrected by the image correction.

The electronic evaluating device may be configured to correct field-point-dependent defocusing by way of the rectification. By way of example, the field-point-dependent defocusing may be caused by a field curvature and/or an astigmatism of an optical system of the image-recording apparatus, for example the illuminating device.

A vector field defining the rectification may depend both on the illumination angle when recording the image subjected to the image correction and on the field-point-dependent defocusing. The field-point-dependent defocusing may be independent of the illumination angle. The vector field defining the rectification may be ascertained efficiently by virtue of determining the offset of points of an object plane caused by the field-point-dependent defocusing.

The electronic evaluating device may be configured to correct the field curvature by way of a rectification.

The rectification may depend on an object field curvature assigned to the field curvature. The object field curvature assigned to the field curvature may be determined for the optical system by computation by virtue of ascertaining the curved surface which is imaged by the optical system of the image-recording apparatus into a plane of the image sensor.

The rectification which is applied to an image may depend on a field-point-dependent offset of a point of an object plane, said point experiencing said offset if it is projected onto a curved surface, which is imaged onto a plane of the image sensor by an optical system of the image-recording apparatus, at the illumination angle. By determining and inverting this offset for a multiplicity of points in the object plane, it is possible to define a vector field which is used for rectifying the image. The vector field defining the rectification depends not only on the object field curvature assigned to the field curvature but also on the illumination angle when recording the respective image.

The vector field defining the rectification may be stored for each one of the plurality of illumination angles in non-volatile fashion in a storage medium of the image-recording apparatus. Alternatively, or additionally, the electronic evaluating device may also be configured to ascertain the vector field defining the rectification by computation for each one of the plurality of illumination angles.

The electronic evaluating device may be configured to correct an astigmatism by way of the rectification. The astigmatism correction may be carried out as an alternative or in addition to the field curvature correction.

The rectification which is applied to an image may depend on a position of a beam, incident at the illumination angle, in relation to at least two planes of the astigmatism. Each one of the at least two planes of the astigmatism may be defined by a meridian of a lens of the image-recording apparatus and an optical axis, with the meridians being assigned to different focal positions.

The image sensor may comprise a plurality of color channels. The rectification which is applied to an image may be different for the various color channels. In this way, it is possible to take chromatic aberrations into account. By way of example, longitudinal chromatic aberrations and/or transverse chromatic aberrations may be corrected at the same time as a field curvature correction and/or an astigmatism correction.

The detector of the image-recording apparatus may have a detector depth-of-field which is smaller than an object field curvature along the optical axis. The detector of the image-recording apparatus may have a detector depth-of-field which is smaller than a defocusing caused by an astigmatism along the optical axis.

If other optical aberrations are intended to be corrected by the image-recording apparatus, the detector of the image-recording apparatus may have a detector depth-of-field which is smaller than the sum of the defocusing along the optical axis which is caused by the various optical aberrations. By way of example, the detector may have a detector depth-of-field which is less than the sum of a defocus caused by longitudinal chromatic aberrations, a defocus caused by field curvature and a defocus caused by astigmatism.

For the plurality of illumination angles, information about the rectification to be applied may be respectively stored in non-volatile fashion in a storage medium of the image-recording apparatus.

The electronic evaluating device may be configured to add the images corrected by the image correction in order to calculate a results image.

The electronic evaluating device may be configured to use the plurality of images after the image correction for Fourier ptychography. The electronic evaluating device may be configured to calculate a phase and amplitude distribution of the object depending on the images corrected by the image correction. The electronic evaluating device may be configured to reconstruct a spectrum of the object in the coordinate space and determine the phase and amplitude distribution of the object by a Fourier transform.

The electronic evaluating device may be configured to ascertain a phase-contrast image from the plurality of corrected images after the image correction.

The image-recording apparatus may be configured for automatically setting the focus. To this end, it is possible to use a parallax when recording the object at at least two different illumination angles.

The electronic evaluating device may be configured to apply the image correction onto an image which was captured for one illumination angle while the detector captures a further image for a further illumination angle. By parallelizing image correction and recording of further images at different illumination angles, the time required up to the provision of the results image may be reduced further.

The image-recording apparatus may be a microscope system. The images may be captured in a transmission arrangement. The images may be captured in a reflection arrangement.

A method for recording images according to one exemplary embodiment comprises capturing a plurality of images when an object is illuminated at a plurality of illumination angles. The method comprises processing the plurality of images. Here, an image correction is applied to each image of the plurality of images, wherein the image correction comprises a rectification which depends on the illumination angle when recording the respective image. The plurality of images corrected by the image correction are combined.

According to one exemplary embodiment, the method may be carried out automatically by the image-recording apparatus.

A field-point-dependent defocusing may be corrected in the method by way of the rectification. By way of example, the field-point-dependent defocusing may be caused by a field curvature and/or an astigmatism of an optical system of the image-recording apparatus.

In the method, a vector field defining the rectification may depend both on the illumination angle when recording the image subjected to the image correction and on the field-point-dependent defocusing. The field-point-dependent defocusing may be independent of the illumination angle. The vector field defining the rectification may be ascertained efficiently by virtue of determining the offset of points of an object plane caused by the field-point-dependent defocusing.

A field curvature may be corrected in the method by way of the rectification.

In the method, the rectification may depend on an object field curvature assigned to the field curvature. The object field curvature assigned to the field curvature may be determined for the optical system by computation by virtue of ascertaining the curved surface which is imaged by the optical system of the image-recording apparatus into a plane of the image sensor.

In the method, the rectification which is applied to an image may depend on a field-point-dependent offset of a point of an object plane, said point experiencing said offset if it is projected onto a curved surface, which is imaged onto a plane of the image sensor by an optical system of the image-recording apparatus, at the illumination angle. By determining and inverting this offset for a multiplicity of points in the object plane, it is possible to define a vector field which is used for rectifying the image. The vector field defining the rectification depends not only on the object field curvature assigned to the field curvature but also on the illumination angle when recording the respective image.

In the method, the vector field defining the rectification for each one of the plurality of illumination angles may be stored in non-volatile fashion in a storage medium of the image-recording apparatus and retrieved from the storage medium for image correction purposes. Alternatively, or additionally, the vector field defining the rectification may be ascertained by computation in the method for each one of the plurality of illumination angles.

An astigmatism may be corrected in the method by way of the rectification. The astigmatism correction may be carried out as an alternative or in addition to the field curvature correction.

The rectification which is applied to an image in the method may depend on a position of a beam, incident at the illumination angle, in relation to at least two planes of the astigmatism. Each one of the at least two planes of the astigmatism may be defined by a meridian of a lens of the image-recording apparatus and an optical axis, with the meridians being assigned to different focal positions.

An image sensor, by means of which the plurality of images are captured, may have a plurality of color channels. The rectification which is applied to an image in the method may be different for the various color channels. In this way, it is possible to take chromatic aberrations into account. By way of example, longitudinal chromatic aberrations or transverse chromatic aberrations may be corrected at the same time as a field curvature correction and/or a longitudinal chromatic aberration correction.

The detector which is used to capture the plurality of images may have a detector depth-of-field which is greater than an object field curvature along the optical axis. The detector may have a detector depth-of-field which is greater than a defocusing caused by an astigmatism along the optical axis.

If other optical aberrations are intended to be corrected by the image-recording apparatus, the detector may have a detector depth-of-field which is smaller than the sum of the defocusing along the optical axis which is caused by the various optical aberrations. By way of example, the detector may have a detector depth-of-field which is less than the sum of a defocus caused by longitudinal chromatic aberrations, a defocus caused by field curvature and a defocus caused by astigmatism.

For the plurality of illumination angles, information about the rectification to be applied may be respectively stored in non-volatile fashion in a storage medium of the image-recording apparatus and retrieved from the storage medium for image correction purposes.

In the method, a rectification of an image may comprise rounding a field-point-dependent vector to an integer pixel spacing.

In the method, a rectification of an image may comprise an interpolation between a plurality of pixel values if a field-point-dependent displacement, which is applied to a pixel, does not equal an integer pixel spacing of the image sensor.

Combining the plurality of images after the image correction may comprise adding the images corrected by the image correction in order to calculate a results image.

In the method, the plurality of images may be used for Fourier ptychography after the image correction. It is possible to calculate a phase and amplitude distribution of the object. A spectrum of the object may be reconstructed in the coordinate space, wherein the phase and amplitude distribution of the object may be determined by a Fourier transform.

In the method, a phase-contrast image may be ascertained from the plurality of corrected images after the image correction.

The method may comprise automatic setting of the focus. To this end, it is possible to use a parallax when recording the object at at least two different illumination angles.

In the method, the image correction may be applied onto an image which was captured for one illumination angle while a further image for a further illumination angle is captured. By parallelizing image correction and recording of further images at different illumination angles, the time required up to the provision of the results image may be reduced further.

Apparatuses and methods according to exemplary embodiments allow the use of cost-effective optical units. The recorded images may be processed in a quick, resolution-maintaining and artifact-reducing manner. Field-point-dependent corrections of defocusing aberrations, which are caused by a field curvature and/or an astigmatism, are possible.

The features set out above and features that are described below may be used not only in the corresponding combinations explicitly set out, but also in further combinations or in isolation, without departing from the scope of protection of the present invention.

BRIEF DESCRIPTION OF THE FIGURES

The above-described properties, features and advantages of this invention and the way in which they are achieved will become clearer and more clearly understood in association with the following description of the exemplary embodiments which are explained in greater detail in association with the drawings.

DETAILED DESCRIPTION OF EXEMPLARY EMBODIMENTS

The present invention is explained in greater detail below on the basis of preferred embodiments with reference to the drawings. In the figures, identical reference signs designate identical or similar elements. The figures are schematic illustrations of various embodiments of the invention. Elements illustrated in the figures are not necessarily illustrated in a manner true to scale. Rather, the different elements depicted in the figures are reproduced in such a way that their function and purpose become comprehensible to the person skilled in the art.

Connections and couplings between functional units and elements as illustrated in the figures may also be implemented as indirect connection or coupling. A connection or coupling may be implemented in a wired or wireless manner.

Techniques by means of which optical aberrations which are caused by defocusing of an illumination of an object may be corrected by computation are described below. Here, a "correction" and "correcting" of optical aberrations are understood to mean measures by means of which the quality of the generated results image may be improved and at least certain optical aberrations, such as e.g. defocusing aberrations caused by field curvature and/or astigmatism, may be reduced.

As will be described in more detail below, a plurality of images of an object are recorded sequentially in exemplary embodiments of the invention. An illumination angle for illuminating the object is set to various values for recording the plurality of images. An image correction is applied to each one of the images. The image correction may comprise a rectification, in which pixels are displaced in the image plane in a field-point-dependent manner. Field-point-dependent defocusing may be corrected by the rectification. By way of example, such field-point-dependent defocusing may be caused by field curvature and/or astigmatism.

Processing the captured images which the image correction contains by computation may be based on data which are stored in non-volatile fashion in a storage medium of an image-recording apparatus. The data may comprise the rectification to be applied in each case for various illumination angles. Alternatively, or additionally, the data may contain information from which an electronic evaluating device ascertains the rectification to be applied, for example by calculating a vector field defining the rectification.

The data which are used during the operation of the image-recording apparatus for the computational image correction may be determined in advance by computation and stored in the storage medium. The data may also be generated by a calibration measurement on the image-recording apparatus using reference objects and stored in non-volatile fashion.

By combining the plurality of images after the image correction, the electronic evaluating device is able to automatically generate a results image which contains the information from the plurality of images. The results image may be generated in such a way that it contains a rectification and summation of images, without any of the images needing to be deconvolved with a point spread function (PSF) thereof.

Figure 1:
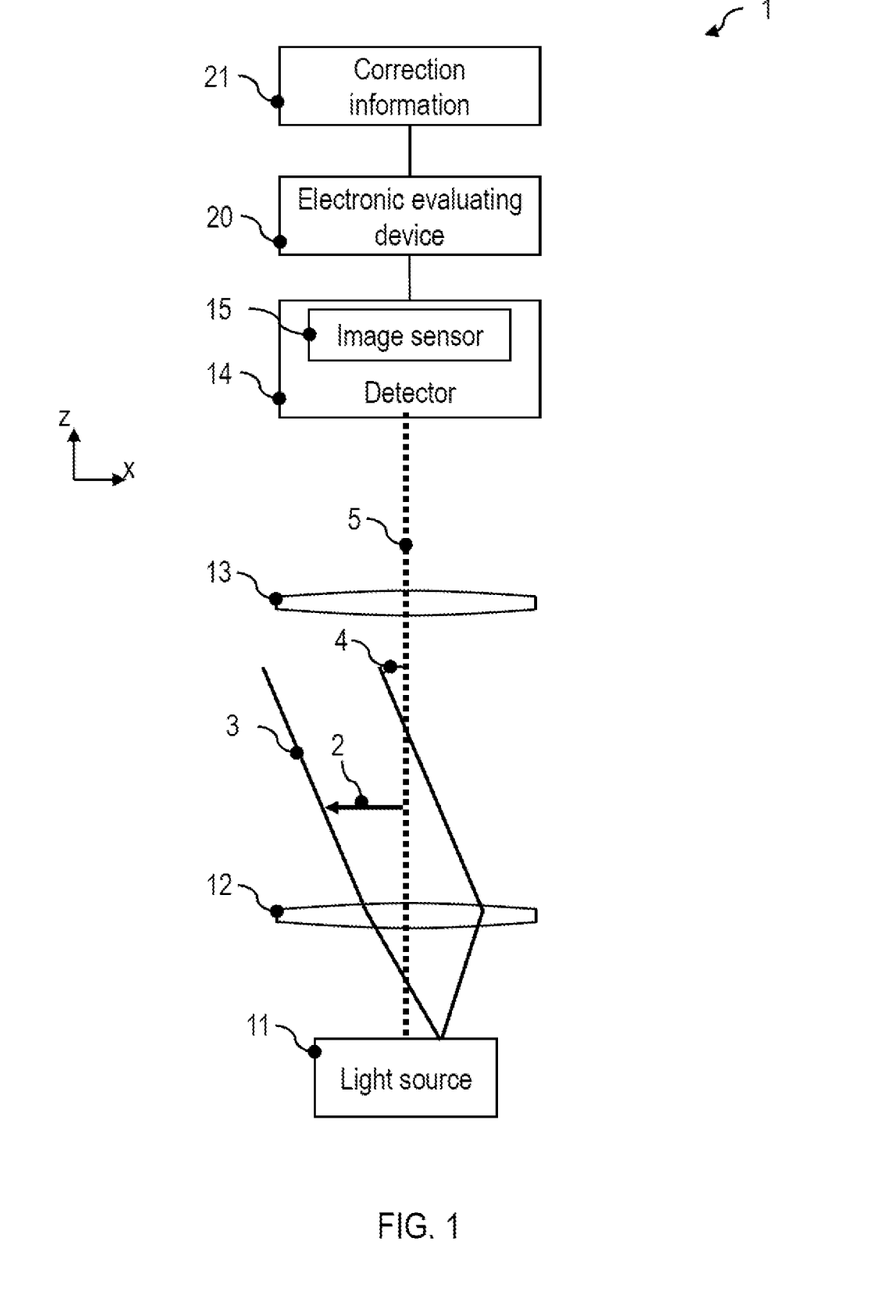
FIG. 1 is a schematic illustration of an image-recording apparatus according to one exemplary embodiment.

FIG. 1 is a schematic illustration of an image-recording apparatus 1 according to one exemplary embodiment. The image-recording apparatus 1 may be configured to automatically carry out methods according to exemplary embodiments. The image-recording apparatus 1 may be a microscope system or may comprise a microscope which is provided with a controllable illuminating device, which is described in more detail, a camera comprising an image sensor, and an electronic evaluating device for correcting images.

The image-recording apparatus 1 comprises an illuminating device comprising a light source 11. In a manner known per se, a condenser lens 12 may deflect the light emitted by the light source 11 onto an object 2 to be imaged. The illuminating device is configured in such a way that light may be radiated onto the object 2 at a plurality of different illumination angles 4. By way of example, the light source 11 may comprise a light-emitting diode (LED) arrangement with a plurality of LEDs, which may be individually actuatable, for this purpose. The LED arrangement may be an LED ring arrangement. Alternatively, a controllable element may be arranged in an intermediate image plane, into which a conventional light source is imaged in a magnified manner, in order to provide different illumination angles. The controllable element may comprise a movable pinhole, a micromirror arrangement, a liquid-crystal matrix or a spatial light modulator.

The illuminating device may be configured in such a way that the absolute value of the illumination angle 4, which is included with an optical axis 5, may be modified. The illuminating device may be configured in such a way that a direction of the beam 3, by means of which the object may be illuminated at the illumination angle 4, may also be moved around the optical axis 5 in a polar direction.

A detector 14 of the image-recording apparatus 1 in each case captures at least one image of the object 2 for each one of a plurality of illumination angles, at which the object 2 is illuminated. By way of example, an image sensor 15 of the detector 14 may be configured as a CCD sensor, a CMOS sensor or as a TDI ("time delay and integration") CCD sensor. An imaging optical unit, for example a microscope objective 13 which is only depicted schematically, may generate a magnified image of the object 2 at the image sensor 15. The image sensor 15 may comprise a planar surface for image recording purposes.

The image-recording apparatus 1 comprises an electronic evaluating device 20. The electronic evaluating device 20 further processes the plurality of captured images of the object for the plurality of illumination angles. The electronic evaluating device 20 applies an image correction to the captured images. As described in more detail with reference to FIG. 2 to FIG. 13, the image correction in each case contains a rectification which depends on the illumination angle when recording the image. The rectification for image correction purposes may reduce the field-point-dependent offset, which is caused by field curvature or astigmatism or another field-point-dependent defocusing aberration. To this end, the field-point-dependent displacement, by means of which pixels are displaced in the image plane, may be set depending on field-point-dependent defocusing. Different color channels of an image may be corrected by different rectifications in order to generate a corrected image.

The image-recording apparatus 1 comprises a storage medium with correction information 21. The electronic evaluating device 20 is coupled to the storage medium or may comprise the latter. The electronic evaluating device 20 may ascertain, dependent on the correction information in the storage medium, the image correction to be respectively applied for each illumination angle.

The corrected images which are respectively assigned to one of a plurality of illumination angles may be combined in different ways. By way of example, the images may be added after the image correction. For a reconstruction of amplitude and phase information of the object 2, the images may be used in a Fourier ptychography. The corrected images may be used to ascertain a focal position or, in any other way, to automatically set the image-recording apparatus 1. The corresponding processing may be carried out automatically by the electronic evaluating device 20.

Since the electronic evaluating device 20 is able to carry out an image correction by rectifying the images, the processing is real-time-capable. The image-recording apparatus 1 may comprise a user interface with an optical outputting device, on which the electronic evaluating device 20 may output the generated results image during operation. A deconvolution of individual images with the point spread function thereof, which is complicated from a computational point of view, is no longer mandatory. By combining information from images which were captured in the case of illumination at a plurality of illumination angles, it is also possible to obtain information about those coordinate space frequencies of the object 2 at which the MTF for one of the illumination angles has a zero.

The functionality of the image-recording apparatus according to exemplary embodiments is described in more detail with reference to FIG. 2 to FIG. 13.

Figure 2:
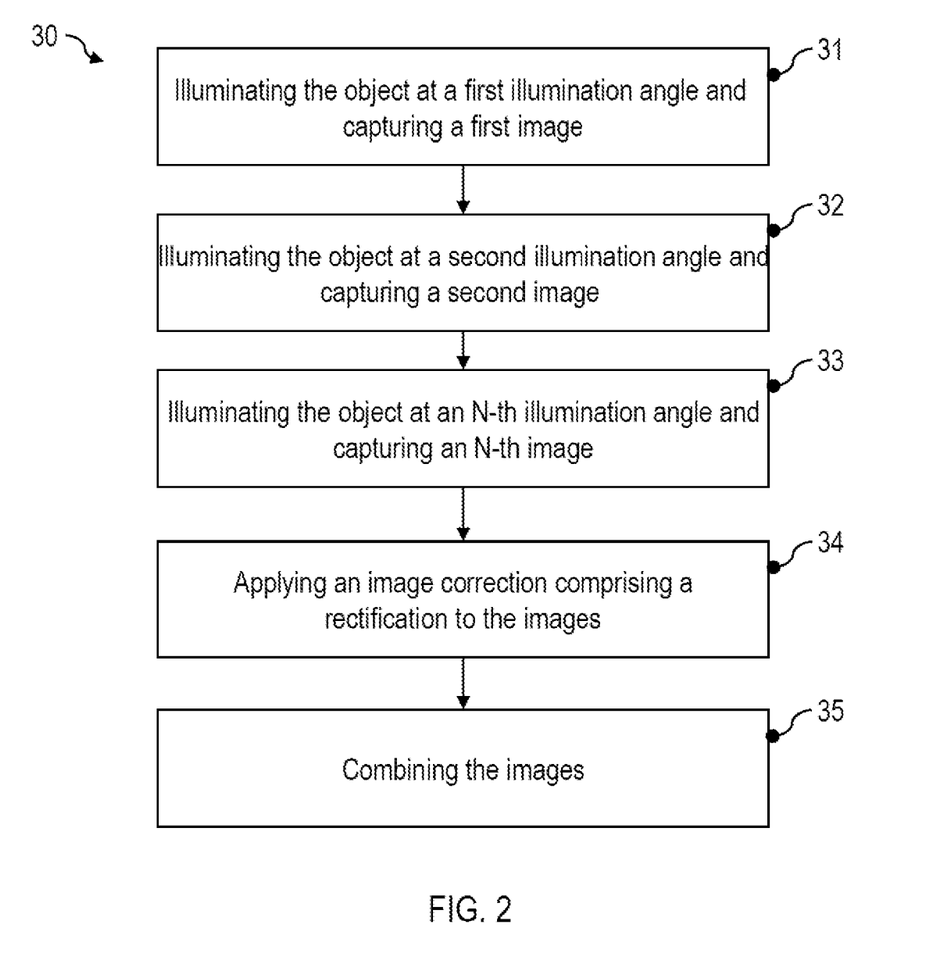
FIG. 2 is a flowchart of a method according to one exemplary embodiment.

FIG. 2 is a flowchart of a method 30 according to one exemplary embodiment. The method may be carried out automatically by the image-recording apparatus 1.

The object is illuminated at a first illumination angle in step 31. By way of example, the illuminating device may be actuated by the electronic evaluating device 20 in such a way that the object is illuminated at the first illumination angle. The image sensor 15 captures a first image.

The object is illuminated at a second illumination angle in step 32. The second illumination angle may differ from the first illumination angle. To this end, the illuminating device may be actuated accordingly. The image sensor 15 captures a second image.

Sequentially illuminating the object at different illumination angles and image recording may be repeated.

The object is illuminated at an N-th illumination angle in step 33, where N is an integer >1. To this end, the illuminating device may be actuated accordingly. The image sensor 15 captures an N-th image.

An image correction is applied in step 34 to each one of the N images. The image correction comprises a rectification. The rectification may be defined by a vector field, according to which pixels may be displaced and/or interpolated in a spatially dependent manner. The image correction may be applied with temporal overlap with the capture of further images. By way of example, a corrected first image may be ascertained by the image correction of the first image while, at the same time, a subsequent image recording takes place in step 32 or 33.

In step 35, the images captured for different illumination angles of the object illumination may be combined by computation. The images may be added to this end. More complicated processing is possible. By way of example, phase information of the object 2 may be determined by computation from the plurality of images. The images corrected by the image correction may be used for a Fourier ptychography algorithm.

Figure 3:
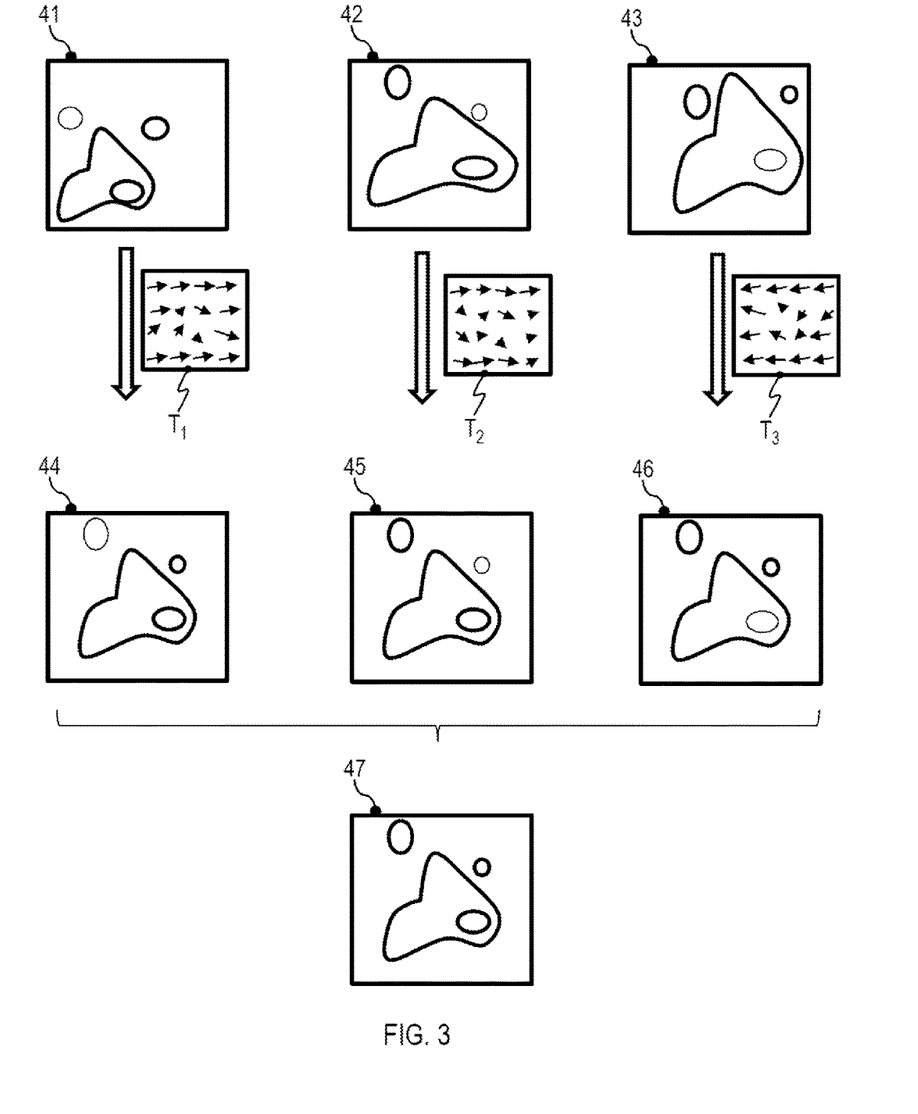
FIG. 3 elucidates the processing of a plurality of images in apparatuses and methods according to exemplary embodiments.

FIG. 3 is a schematic illustration for explaining the mode of operation of the image-recording apparatus 1 in more detail.

A first image 41 is captured when illuminating the object at a first illumination angle. A second image 42 is captured when illuminating the object at a second illumination angle. A third image 43 is captured when illuminating the object at a third illumination angle.

The electronic evaluating device 20 rectifies the first image 41 by way of a transformation $T_1$ in order to generate a corrected first image 44. The transformation $T_1$ may contain a field-point-dependent displacement of pixels in the image plane. Pixels of the first image 44 may be interpolated in accordance with the transformation $T_1$. The transformation $T_1$ may contain a linear map into the corrected first image 44 for pixels of the recorded first image 41, by means of which linear map a distortion caused by field-point-dependent defocusing may be corrected again, as will be described in more detail on the basis of FIG. 4 to FIG. 13.

The electronic evaluating device 20 rectifies the second image 42 by way of a transformation $T_2$ in order to generate a corrected second image 45. The transformation $T_2$ may contain a field-point-dependent displacement of pixels in the image plane. Pixels of the second image 45 may be interpolated in accordance with the transformation $T_2$. The transformation $T_2$ may contain a linear map into the corrected second image 45 for pixels of the recorded second image 42, by means of which linear map a distortion caused by field-point-dependent defocusing may be corrected again, as will be described in more detail on the basis of FIG. 4 to FIG. 13. On account of the illumination-angle-dependence of the image correction, the second transformation $T_2$ differs from the first transformation $T_1$.

The electronic evaluating device 20 rectifies the third image 43 by way of a transformation $T_3$ in order to generate a corrected third image 46. The transformation $T_3$ may contain a field-point-dependent displacement of pixels in the image plane. Pixels of the third image 46 may be interpolated in accordance with the transformation $T_3$. The transformation $T_3$ may contain a linear map into the corrected third image 46 for pixels of the recorded third image 43, by means of which linear map a distortion caused by field-point-dependent defocusing may be corrected again, as will be described in more detail on the basis of FIG. 4 to FIG. 13. On account of the illumination-angle-dependence of the image correction, the third transformation $T_3$ differs from the first transformation $T_1$ and the second transformation $T_2$.

The corrected images 44-46 may be combined with one another. By way of example, a results image 47 may be ascertained by adding the corrected images 44-46. The addition may be used for averaging of the corrected images 44-46.

Alternatively, or additionally, phase and/or amplitude information about the imaged object may be ascertained from the corrected images 44-46. Automatic focusing onto the object by way of computation may be carried out. To this end, it is possible, for example, to ascertain the distance of the object and the position thereof relative to a focal plane of the detector 14 from a parallax which is determined for different illumination angles.

As described in more detail with reference to FIG. 4 to FIG. 13, optical aberrations which are caused by a field curvature and/or an astigmatism may be corrected by image-recording apparatuses and methods according to exemplary embodiments. To this end, a rectification may be defined in such a way that an offset of an object point in the directions perpendicular to the optical axis 5, said offset being caused by defocusing along the optical axis 5, is compensated for again by computation.

Figure 4:
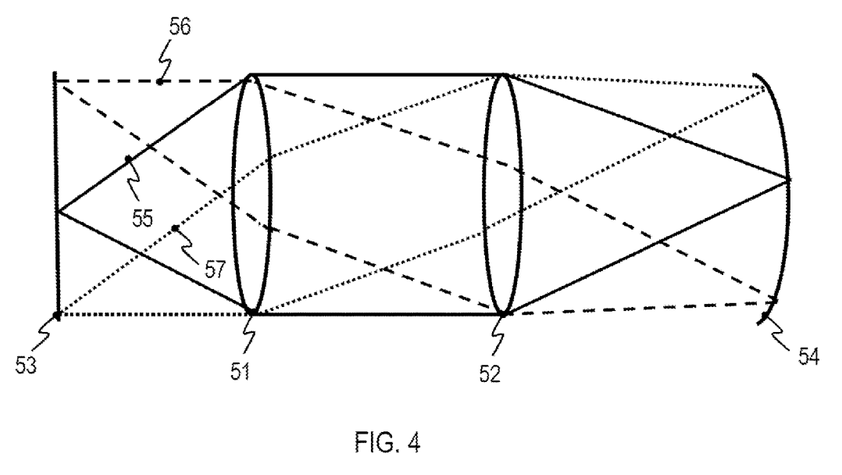
FIG. 4 elucidates the application of an image-recording apparatus and a method according to exemplary embodiments for field curvature correction.
Figure 5:
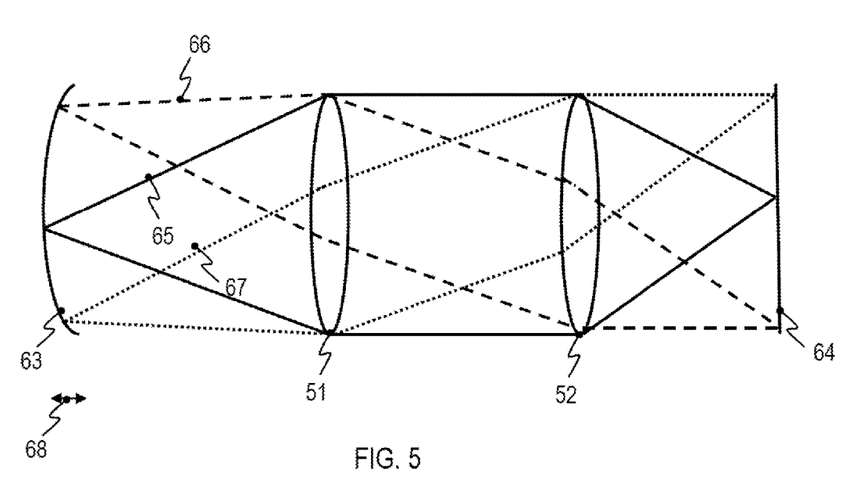
FIG. 5 elucidates the application of an image-recording apparatus and a method according to exemplary embodiments for field curvature correction, wherein an object field curvature assigned to the field curvature is ascertained.

FIG. 4 and FIG. 5 elucidate the field curvature correction in the case of apparatuses and methods according to exemplary embodiments. FIG. 4 and FIG. 5 schematically show an optical system of the image-recording apparatus, said optical system comprising a plurality of lenses 51, 52 for imaging an object onto an image sensor. A planar surface 53 of an object may be imaged into a curved surface 54 by the optical system on account of optical aberrations. FIG. 4 schematically shows beam paths 55-57 for the purposes of explaining the field curvature.

If use is made of an image sensor comprising a planar surface for image-recording purposes, the curvature of the surface 54 leads to distortions of the object.

In order to compensate for such distortions, the rectification may be determined as a field-point-dependent correction which is used when reconstructing the object from the captured images. An object field curvature is assigned to the field curvature, said object field curvature setting the offset perpendicular to the optical axis by which a field point of the object field appears displaced. This offset may be compensated for again by the rectification by computation, as will be explained in more detail with reference to FIG. 5 to FIG. 8.

FIG. 5 elucidates the object field curvature assigned to the field curvature. On account of optical aberrations, a curved surface 63 is imaged into a planar surface 64 by the optical system of the image-recording apparatus, said planar surface representing the sensitive plane of the image sensor 15. The curved surface 63 may be ascertained in a manner known per se by computation. To this end, the optical properties of the optical system may be simulated in order to determine the curved surface 63 which is imaged into the planar surface 64 of the image sensor 15. Alternatively, or additionally, measurements may also be undertaken on reference objects in order to determine the rectification by means of which the offset caused by the z-defocusing on account of the curvature of the curved surface 63 may be corrected. The information about the curved surface 63 need not be determined during the image recording and processing, but may be ascertained in advance and used subsequently during the image processing.

As described, images of the object are captured for illumination at a plurality of illumination angles in apparatuses and methods according to exemplary embodiments. A field-point-dependent offset, which is compensated for by computation, emerges from the curvature of the curved surface 63 for each one of the illumination angles. Here, a detector depth-of-field of the detector is greater than the maximum defocusing along the optical axis 5, which is determined by the object field curvature 68 along the optical axis.

Figure 6:
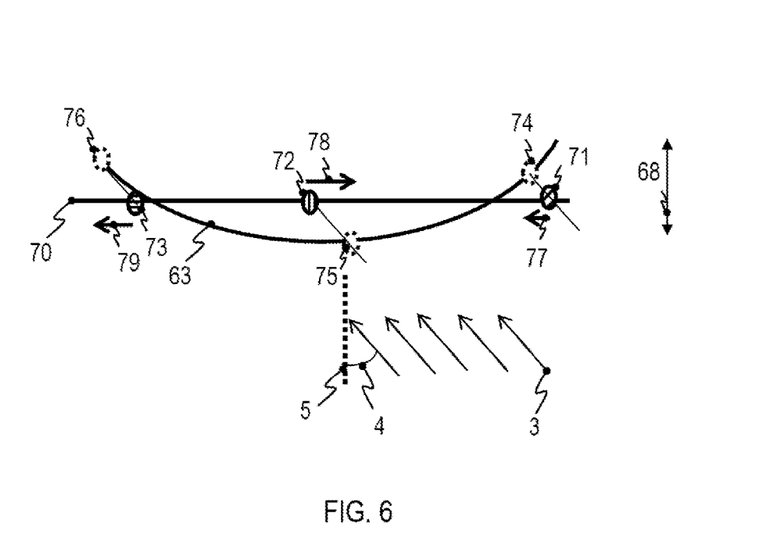
FIG. 6 elucidates the dependence of the rectification on the illumination angle and field-point-dependent defocusing.

FIG. 6 elucidates how an offset, which is corrected in apparatuses and methods according to exemplary embodiments, arises in the plane perpendicular to the optical axis. A plurality of points 71-73 of an object field are arranged in a plane 70. As a result of the field curvature, the points 71-73 appear not at their actual positions but rather offset in the image plane. The offset may be determined by projecting the points 71-73 into the curved surface 63 which is imaged into the plane 64 of the image sensor 15 by the optical system.

The illumination of the object at an illumination angle 4 is depicted in an exemplary manner. The object is illuminated by a parallel beam 3 which may include an angle with the optical axis 5. As a result of the field curvature and the object field curvature assigned to the field curvature, a first point 71 of the object field does not appear at its actual position in the image but rather at a position which is set by the projection 74 of the first point 71 onto the curved surface 63 along the beam 3 incident at the illumination angle 4. This leads to an offset 77 in the image recording. The offset 77 may be corrected during the image correction. To this end, it is possible to apply a rectification with the inverse onto the corresponding pixel of the image, with which the offset 77 is corrected.

As a result of the field curvature and the object field curvature assigned to the field curvature, a second point 72 does not appear at its actual position in the image but rather at a position which is set by the projection 75 of the second point 72 onto the curved surface 63 along the beam 3 incident at the illumination angle 4. This leads to an offset 78 in the image recording.

As a result of the field curvature and the object field curvature assigned to the field curvature, a third point 73 does not appear at its actual position in the image but rather at a position which is set by the projection 76 of the third point 73 onto the curved surface 63 along the beam 3 incident at the illumination angle 4. This leads to an offset 79 in the image recording.

The offset 77-79, which may be determined for a plurality of points in the plane 70 by computation, may be inverted. In this way, it is possible to determine a vector field which defines the rectification and which is applied to the image for image correction purposes.

While FIG. 6 only shows a cut through the curved surface 63, the curvature may exist in more than one direction. The radii of curvature along the x-direction and y-direction orthogonal to the optical axis may differ from one another. Hence, the offset 77-79, which is ascertained by projecting points of an object field 70 onto the curved surface 63 along the beam direction 3 defined by the illumination angle 4, may be a two-dimensional vector in each case. Direction and amplitude of the offset may vary in a field-point-dependent manner and are dependent on the illumination angle in each case. Accordingly, the rectification defines a transformation which is field-point-dependent and which is defined by the field-point-dependent defocus in combination with the illumination angle.

Figure 7:
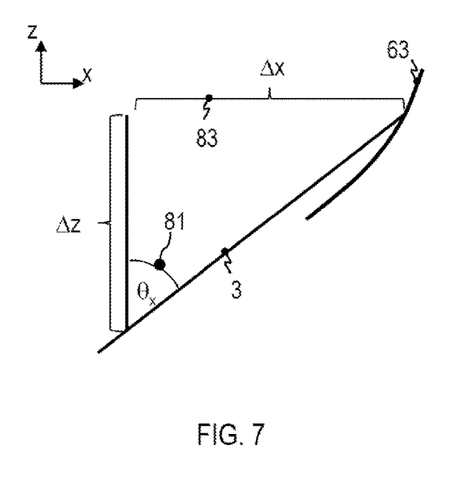
FIG. 7 and FIG. 8 illustrate ascertaining a field-point-dependent displacement inverted during the field curvature correction.
Figure 8:
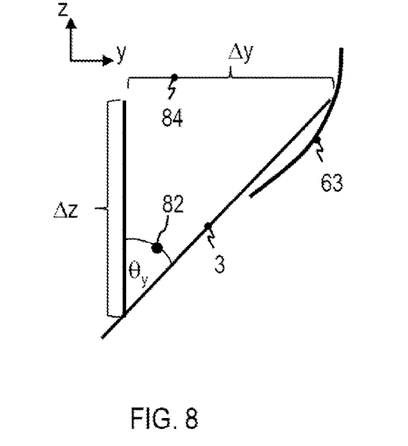

FIG. 7 and FIG. 8 elucidate determining the two-dimensional offset which is corrected by the rectification. On account of the field curvature, a point of the object field has a z-defocus Δz. The illumination angle is set in such a way that the incident beam 3 includes an angle 81, denoted by $\theta_x$, with the yz-plane. The illumination angle is set in such a way that the incident beam 3 includes an angle 82, denoted by $\theta_y$, with the xz-plane. The lateral offset 83, 84, which is once again taken into account during the reconstruction of the object, may be determined as $$\Delta x = \tan(\theta_x) \cdot \Delta z(x,y) \tag{1}$$

in the x-direction and $$\Delta y = \tan(\theta_y) \cdot \Delta z(x,y) \tag{2}$$

in the y-direction. Here, the defocusing Δz(x,y) is field-point-dependent. When reconstructing the object, a rectification which is dependent on the illumination angle and the field-point-dependent defocusing may be applied to each image, said rectification at least correcting this distortion.

The object field curvature may be different for different wavelengths in the case of chromatic aberration. In this case, the processing described may be carried out for each one of a plurality of wavelengths which, for example, may be the centroid wavelengths of the plurality of color channels of the image sensor 15. The image may be corrected with rectification in each one of the color channels, said rectification depending on the illumination angle and the field-point-dependent defocusing at the centroid wavelength of the color channel.

Figure 9:
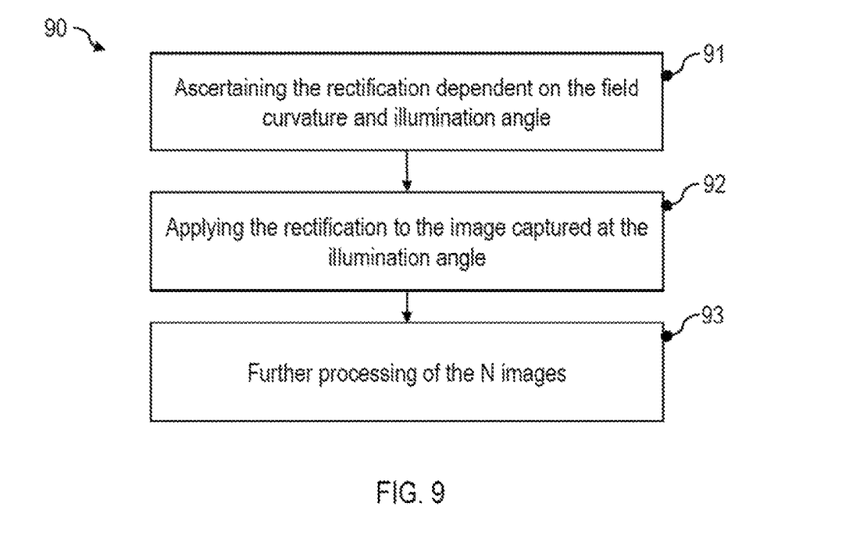
FIG. 9 is a flowchart of a method according to one exemplary embodiment for field curvature correction.
Figure 10:
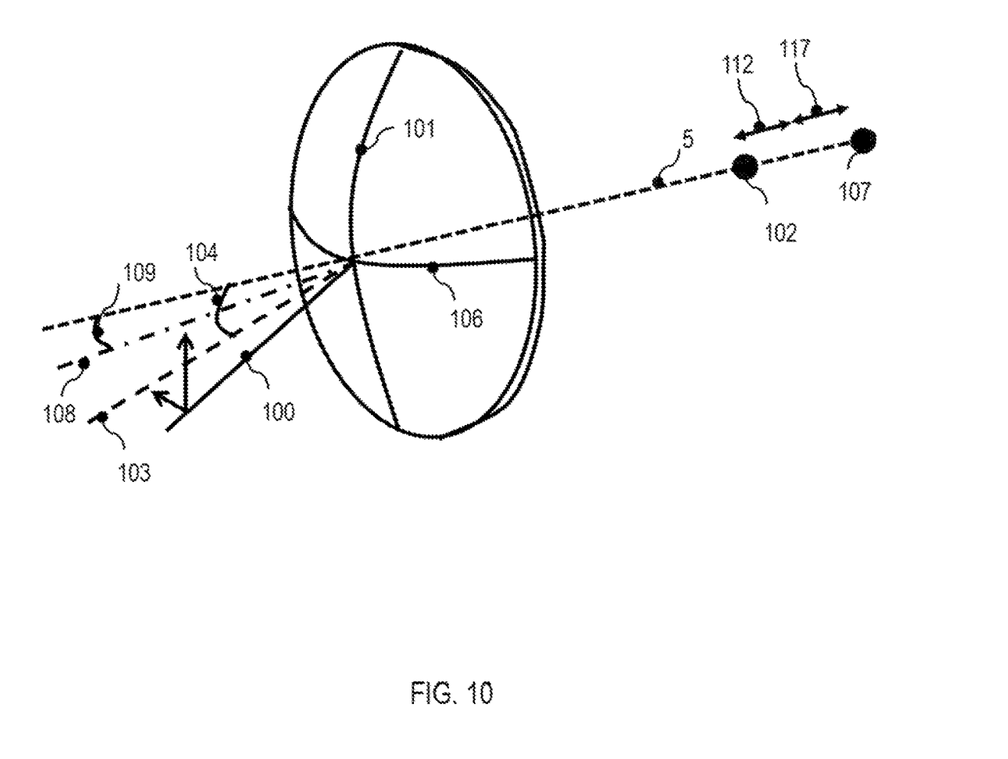
FIG. 10 elucidates the application of an image-recording apparatus and a method according to exemplary embodiments for astigmatism correction.

FIG. 9 is a flowchart of a method 90 for correcting field curvature. The method may be carried out automatically by the electronic evaluating device 20.

In step 91, it is possible to ascertain what transformation should be applied to the image for rectification purposes. The rectification depends on the illumination angle when recording the image. By way of example, as described with reference to FIG. 3 to FIG. 9, the rectification may depend on the field-point-dependent defocusing and the illumination angle.

The rectification may be ascertained in various ways. In one configuration, information about the field curvature or the object field curvature assigned thereto may be stored in non-volatile fashion in a storage medium of the image-recording apparatus. The electronic evaluating device may then calculate the rectification for each one of the illumination angles. In a further configuration, the rectification itself may already be stored on a characteristic field basis. By way of example, a linear map may be stored in non-volatile fashion in the image-recording apparatus for each one of the plurality of illumination angles, said linear map being used to calculate the corrected images from the captured images. By way of example, the linear map may be stored in the form of a matrix which defines a map of a vector containing the pixel values of the recorded image to a vector containing the pixel values of the corrected image. The linear map may depend on the field-point-dependent defocusing and the illumination angle in each case.

In step 92, the rectification is applied to the images for image correction purposes. The rectification may be carried out in such a way that, with the exception of the pixels on the image edge, pixels from the images rectified in the image plane are once again arranged congruent with pixels of the image sensor. To this end, it is possible e.g. to carry out an interpolation during the rectification, as will be described in more detail on the basis of FIG. 13, in which a pixel of the corrected image is calculated as a weighted superposition of pixels of the recorded image.

Steps 91 and 92 may be carried out for each one of N images, which were captured for N different illumination angles, where N>2 and, in particular, N>>2 may apply.

In step 93, the N corrected images may be combined. The images may be summed. It is possible to ascertain amplitude and/or phase information images in the coordinate space or in the Fourier space.

Figure 11:
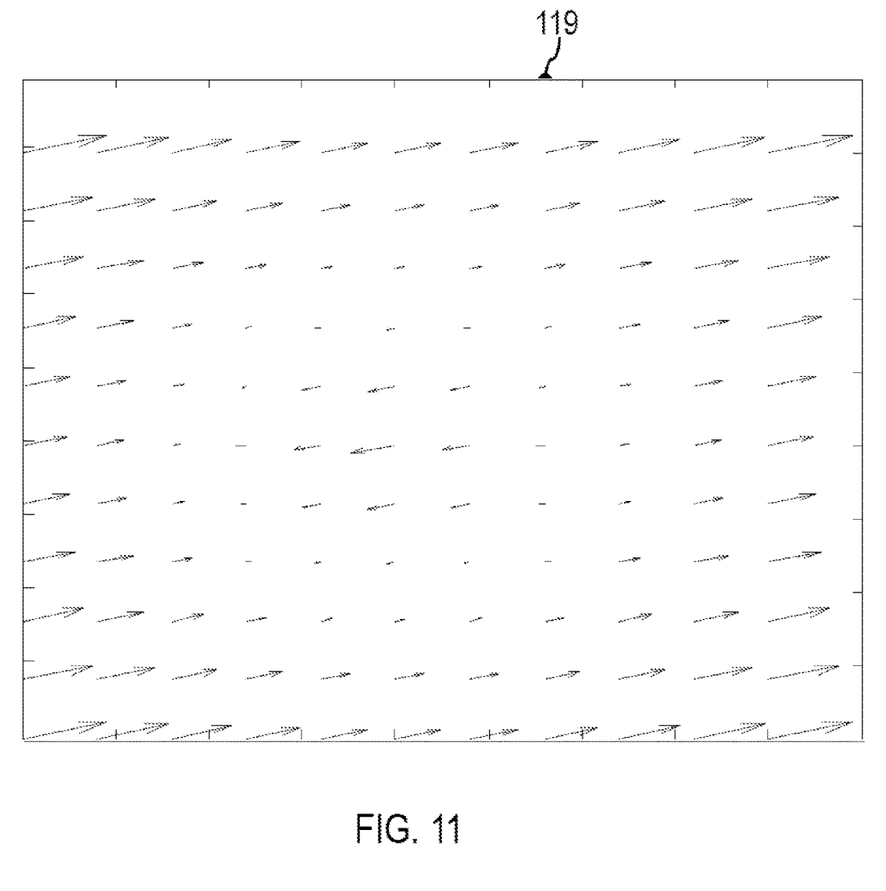
FIG. 11 shows a vector field defining a rectification for field curvature correction and/or astigmatism correction.

The image-recording apparatus and methods according to exemplary embodiments may also be used, as an alternative or in addition to the longitudinal chromatic aberration correction, for correcting other optical aberrations, for example for correcting an astigmatism, as described in more detail on the basis of FIG. 11.

FIG. 11 shows a partial view of an image-recording apparatus according to one exemplary embodiment, in which an optical unit only depicted schematically, for example of the illuminating device, has an astigmatism. A first meridian 101 extends in a first plane of the astigmatism. The first plane of the astigmatism may define a first focal position 102. A second meridian 106 extends in a second plane of the astigmatism. The second plane of the astigmatism may define a second focal position 107. The first plane may be the plane for which a minimum focal length emerges. The second plane may be the plane for which a maximum focal length emerges.

One or more of the focal positions 102, 107 may be displaced in relation to the z=0 plane, which is imaged in focus by the detector system. The focal positions 102, 107 may have a z-defocus 112, 117 along the optical axis. The z-defocus may vary in a field-point-dependent manner.

When the object is illuminated at an illumination angle, the light may be incident along a beam 90, the direction of which is fixed by the respectively set illumination angle. There may be a projection into the planes of the astigmatism for the purposes of correcting the astigmatism. A projection 103 of the beam 90 incident at the illumination angle into the first plane includes an angle 104 with the optical axis 5. The angle 104 may also be denoted angle $\theta_a$. A projection 108 of the beam 90 incident at the illumination angle into the second plane includes an angle 109 with the optical axis 5. The angle 109 may also be denoted angle $\theta_b$. The plane defined by the first plane of the astigmatism need not coincide with the x-axis or y-axis of the image sensor. However, by way of a coordinate transform in the plane of the image sensor known per se, the coordinate axes may also be defined in such a way that, for example, the line of intersection of the first plane of the astigmatism with the plane of the image sensor corresponds to the x-axis and the line of intersection of the first plane of the astigmatism with the plane of the image sensor corresponds to the y-axis.

A rectification which depends on the illumination direction may be applied to the image for astigmatism correction purposes. The rectification may depend on the z-defocus 112, 117, which emerges for the plurality of planes of the astigmatism.

By way of example, the offset to be compensated for by the rectification may be defined by $$\tan(\theta_a) \cdot \Delta z_a \quad (3)$$

in the direction defined by the line of intersection of the first plane of the astigmatism with the sensor plane and by $$\tan(\theta_b) \cdot \Delta z_b \quad (4)$$

in the direction defined by the line of intersection of the second plane of the astigmatism with the sensor plane. Here, $\Delta z_a$ denotes the z-defocus 112 for the first plane of the astigmatism and $z_b$ denotes the z-defocus 117 for the second plane of the astigmatism.

A field-point-dependence of the astigmatism may be taken into account by the field-point-dependence of the rectification. A vector field which defines the rectification may be variable in the plane of the image sensor.

FIG. 11 elucidates a vector field 119 which may define the rectification of an image. Here, the length and direction of the vectors specify the direction in which and the absolute value by which pixels are displaced in order to rectify the recorded image. As described above, the rectification may be determined depending on the field-point-dependent defocusing and the illumination angle.

While image-recording apparatuses and methods, by means of which a field curvature correction and/or an astigmatism correction may be carried out, were described in an exemplary manner with reference to FIG. 1 to FIG. 11, the techniques described here may also be used for correcting other optical aberrations, for example for correcting chromatic aberrations.

Figure 12:
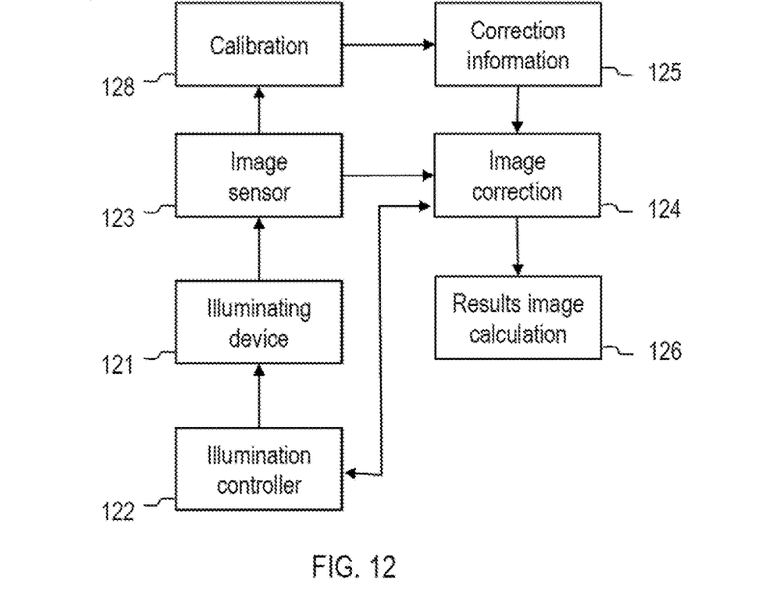
FIG. 12 is a block diagram of an image-recording apparatus according to one exemplary embodiment.

FIG. 12 is a block diagram 120 of an image-recording apparatus according to one exemplary embodiment. The image-recording apparatus may be configured for automatic field curvature correction and/or astigmatism correction.

The image-recording apparatus comprises a controllable illuminating device 121. The object may be illuminated sequentially at a plurality of different illumination angles by means of the illuminating device 121. An illumination controller 122 may control the sequentially set illumination angles. The illuminating device 121 may comprise an LED arrangement. The illuminating device 121 may comprise a controllable optical element in an intermediate image plane, said controllable optical element, for example, being able to comprise a movable pinhole, a micromirror arrangement, a liquid-crystal matrix or a spatial light modulator.

An image sensor 123 captures at least one image for each one of the illumination angles at which the object is illuminated. The image may comprise information in a plurality of color channels. The image sensor 123 may comprise at least one CCD chip or CMOS chip.

A module for image correction 124 may carry out an image correction. The image correction may depend on the illumination angle used during the image recording. The image correction may comprise a rectification of one, several or all color channels of the image. The rectification may be defined by a linear map from pixels of the recorded image to pixels of the corrected image. The rectification which is applied to one image may be independent of the illumination angles used during the image recording of the other images.

A storage medium with correction information 125 may store information used by the module for image correction 124 in various forms. The correction information may contain information about field-point-dependent defocusing on account of field curvature and/or defocusing for different planes of the astigmatism, from which the rectification to be applied to the image is calculated by the module for image correction 124. The correction information may specify the rectification for different illumination angles. The correction information may define a linear map, for example in the form of an imaging matrix, according to which pixels of the original image are mapped to pixels of a corrected image during the image correction.

The module for image correction 124 may be configured as an application-specific specialist circuit, controller, micro-controller, processor or microprocessor. The module for image correction 124 may be combined with the image sensor 123 in one structural unit which automatically calculates corrected images. As a result, the image correction may be encoded in hardware.

The image-recording apparatus may be configured in such a way that the correction information is ascertained by measurement on the image-recording apparatus itself. The image-recording apparatus may comprise a module for calibration 128, which automatically ascertains the correction information. To this end, recordings of a plurality of known reference objects may be made and processed further by computation in order to determine how the images need to be rectified in order to reconstruct an object.

The image-recording apparatus may comprise a module for image combination 126, by means of which the N corrected images may be combined. The images ascertained after the image correction may be summed or processed further in any other way. The module for image combination 126 may be configured to carry out a Fourier ptychography algorithm. The module for image combination 126 may be configured to ascertain amplitude and/or phase information of the object in the Fourier space.

The image-recording apparatus may comprise further units. By way of example, a unit for setting the autofocus may be present.

In general, a corrected image $I_c$ is ascertained from an image I for rectification purposes. In a simple implementation, the rectified image may be calculated as $$I_c(u,v)=I(u-\Delta x(u,v),v-\Delta y(u,v)) \quad (5)$$

Here, u and v denote pixel coordinates along the x-direction and y-direction of the image sensor. The field-point-dependent vector field ($\Delta x(u, v)$, $\Delta y(u, v)$) defines the rectification. To improve the image correction further, it is possible to take into account that the distortion to be corrected may not always be corrected by a displacement of a pixel by an integer pixel number in the x-direction and y-direction. In this case, rounding or interpolation may be carried out.

By way of example, rounding may be provided such that $$I_c(u,v;j)=I(u-\text{round}(\Delta x_j),v-\text{round}(\Delta y_j);j) \quad (6)$$

is used to ascertain the corrected image. Here, round(•) denotes the rounding function. It is also possible to use the floor function $\lfloor \cdot \rfloor$ or ceiling function $\lceil \cdot \rceil$ instead of the rounding function in equation (6). Rounding may already be taken into account if the displacement is stored in non-volatile fashion in the image-recording apparatus.

It is also possible to carry out an interpolation between different pixel values. Here it is possible, for example, to interpolate four pixel values, or else more than four pixel values, in order to ascertain the rectified image during the image correction. Pixels of the corrected image may be calculated as $$I_c(u,v)=\Sigma_{m,n} w(u,v,m,n) \cdot I(m,n). \quad (7)$$

Here, w(u, v, m, n) denotes a weighting factor, with which the pixel value of the pixel at the point (m, n) of the recorded image is included in the pixel value of the corrected image at the point (u, v) after rectification.

Figure 13:
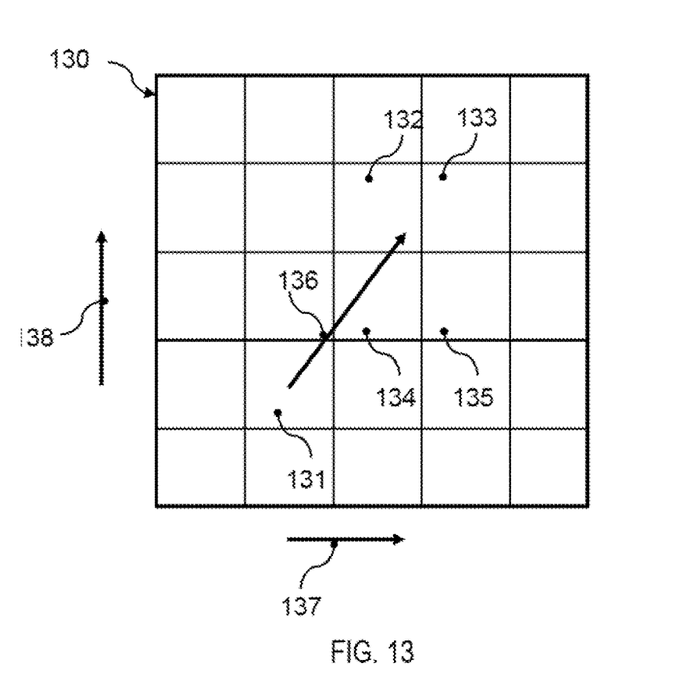
FIG. 13 elucidates different techniques for rectifying an image.

FIG. 13 elucidates the rectification during the image correction. The image sensor has an arrangement of pixels 130. The components of the vector 136 of the vector field defining the rectification need not be integer multiples of the pixel spacings in the two coordinate directions 137, 138. During an interpolation in accordance with equation (7), the pixel values of the pixels 132-135 may be linearly interpolated in order to ascertain the pixel value for the pixel 131 in the corrected image.

While exemplary embodiments were described with reference to the figures, developments may be realized in further exemplary embodiments. While the image-recording apparatus according to exemplary embodiments may, in particular, be a microscope system, the described techniques may also be used in other imaging systems. While the described techniques for field curvature correction and/or astigmatism correction may be used, other optical aberrations may also be corrected alternatively or additionally. The corrected images may be combined with one another in a multiplicity of different ways. By way of example, the corrected images may be used for Fourier ptychography or added for ascertaining a results image.

The invention claimed is:

1. An image-recording apparatus, comprising:
    an illuminating device which is controllable in order to set a plurality of illumination angles for illuminating an object;
    a detector comprising an image sensor, configured to capture a plurality of images of the object for the plurality of illumination angles;
    an electronic evaluating device for processing the plurality of images, coupled to the image sensor, wherein the electronic evaluating device is configured to
    apply an image correction to each image of the plurality of images, said image correction comprising a rectification, wherein the rectification depends on the illumination angle used when recording the respective image, wherein the rectification corrects field-point-dependent defocusing, and wherein a vector field defining the rectification depends both on the illumination angle when recording the image to which the image correction is applied and on the field-point-dependent defocusing; and combine the images corrected by the image correction.

2. The image-recording apparatus as claimed in claim 1, wherein the electronic evaluating device is configured to correct a field curvature by way of the rectification.

3. The image-recording apparatus as claimed in claim 2, wherein the rectification depends on an object field curvature assigned to the field curvature.

4. The image-recording apparatus as claimed in claim 1, wherein, for the plurality of illumination angles, information about the rectification to be applied is respectively stored in non-volatile fashion in a storage medium of the image-recording apparatus.

5. The image-recording apparatus as claimed in claim 1, wherein the electronic evaluating device is configured to add the images corrected by the image correction in order to calculate a results image.

6. The image-recording apparatus as claimed in claim 1, wherein the electronic evaluating device is configured to apply the image correction onto an image which was captured for one illumination angle while the detector captures a further image for a further illumination angle.

7. The image-recording apparatus as claimed in claim 1, wherein the image-recording apparatus is a microscope system.

8. A method for recording images, comprising:
capturing a plurality of images when an object is illuminated at a plurality of illumination angles; and
processing the plurality of images, wherein the processing comprises:
 applying an image correction to each image of the plurality of images, wherein the image correction comprises a rectification which depends on the illumination angle when recording the respective image, the rectification comprising correcting field-point-dependent defocusing, wherein a vector field defining the rectification depends both on the illumination angle when recording the image to which the image correction is applied and on the field-point-dependent defocusing, and
 combining the plurality of images after applying the image correction.

9. The method as claimed in claim 8, further comprising correcting a field curvature by way of the rectification.

10. The method as claimed in claim 8, wherein the rectification which is applied to an image depends on a field-point-dependent offset of a point of an object plane, said point experiencing said offset if it is projected onto a curved surface, which is imaged onto a plane of the image sensor by an optical system of the image-recording apparatus, at the illumination angle.

11. The method as claimed in claim 8, further comprising calculating a vector field defining the rectification depending on the illumination angle used when recording the respective image.

12. An image-recording apparatus, comprising:
an illuminating device which is controllable in order to set a plurality of illumination angles for illuminating an object;
a detector comprising an image sensor, configured to capture a plurality of images of the object for the plurality of illumination angles;
an electronic evaluating device for processing the plurality of images, coupled to the image sensor, wherein the electronic evaluating device is configured to
 apply an image correction to each image of the plurality of images, said image correction comprising a rectification, wherein the rectification depends on the illumination angle used when recording the respective image, wherein the rectification corrects a field curvature, and wherein the rectification which is applied to an image depends on a field-point-dependent offset of a point of an object plane, said point experiencing said offset if it is projected onto a curved surface, which is imaged onto a plane of the image sensor by an optical system of the image-recording apparatus, at the illumination angle; and
 combine the images corrected by the image correction.

13. An image-recording apparatus, comprising:
an illuminating device which is controllable in order to set a plurality of illumination angles for illuminating an object;
a detector comprising an image sensor, configured to capture a plurality of images of the object for the plurality of illumination angles;
an electronic evaluating device for processing the plurality of images, coupled to the image sensor, wherein the electronic evaluating device is configured to
 apply an image correction to each image of the plurality of images, said image correction comprising a rectification, wherein the rectification depends on the illumination angle used when recording the respective image, wherein the rectification corrects a field curvature, and wherein the electronic evaluating device is configured to calculate a vector field defining the rectification depending on the illumination angle used when recording the respective image; and
 combine the images corrected by the image correction.

14. An image-recording apparatus, comprising:
an illuminating device which is controllable in order to set a plurality of illumination angles for illuminating an object;
a detector comprising an image sensor, configured to capture a plurality of images of the object for the plurality of illumination angles;
an electronic evaluating device for processing the plurality of images, coupled to the image sensor, wherein the electronic evaluating device is configured to
 apply an image correction to each image of the plurality of images, said image correction comprising a rectification, wherein the rectification depends on the illumination angle used when recording the respective image, wherein the rectification corrects an astigmatism; and
 combine the images corrected by the image correction.

15. The image-recording apparatus as claimed in claim 14,
wherein the rectification which is applied to an image depends on a position of a beam, incident at the illumination angle, in relation to at least two planes of the astigmatism.

16. A method for recording images, comprising:
capturing a plurality of images when an object is illuminated at a plurality of illumination angles; and
processing the plurality of images, wherein the processing comprises:

applying an image correction to each image of the plurality of images, wherein the image correction comprises a rectification which depends on the illumination angle when recording the respective image, and the rectification is correcting an astigmatism wherein the rectification which is applied to an image depends on a position of a beam, incident at the illumination angle, in relation to at least two planes of the astigmatism, and combining the plurality of images after applying the image correction.

* * * * *